W. F. ROTZIEN.
BLEACHER.
APPLICATION FILED APR. 2, 1909.
965,947.
Patented Aug. 2, 1910.
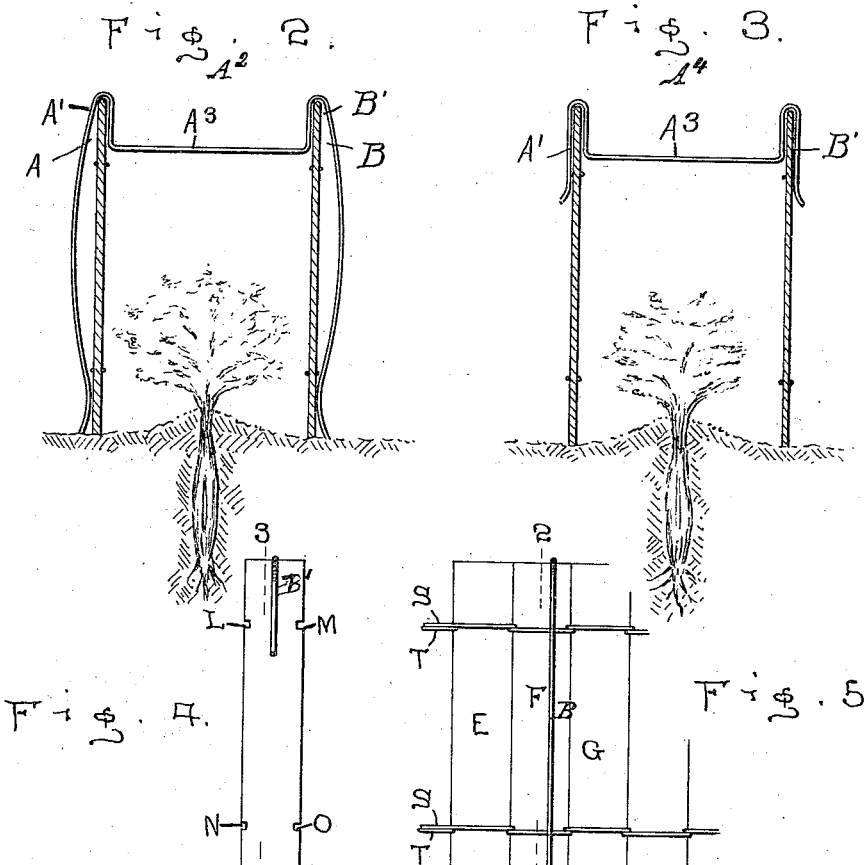

UNITED STATES PATENT OFFICE.

WILLIAM F. ROTZIEN, OF DAYTONA, FLORIDA.

BLEACHER.

965,947.  Specification of Letters Patent.  Patented Aug. 2, 1910.

Application filed April 2, 1909. Serial No. 487,571.

*To all whom it may concern:*

Be it known that I, WILLIAM F. ROTZIEN, a citizen of the United States, residing at Daytona, in the county of Volusia and State of Florida, have invented a new and useful Bleacher, of which the following is a specification.

My invention relates to improvements in bleaching or blanching devices such as are used more especially for bleaching or blanching celery.

It has for its object to provide for easily, quickly and effectively placing the bleachers or blanchers in position with relation to the plants; to provide such a device which is readily portable, conveniently stored away when not in use, and which is adapted to provide for automatically ventilating the plants for protecting the latter from the injurious effect or action of the heat of the sun.

The invention consists of certain structural features substantially as hereinafter fully disclosed and defined by the claims.

In the accompanying drawings illustrating the preferred embodiment of my invention, Figure 1 is a perspective view showing the application of my invention for use. Fig. 2 is a transverse section taken on the line 2—2 of Fig. 5. Fig. 3 is a like section produced on the line 3—3 of Fig. 4. Fig. 4 is a detail side view of Fig. 3, and, Fig. 5 is a like view of Fig. 2.

In carrying out my invention, I form or construct the shields, each, of a plurality or number of slats or strips of wood or other suitable material, as what may be termed ordinary wooden laths, said laths or strips being designated as E, F, G, and having notches L, M, N, O, cut in their lateral edges, near their upper and lower ends; any number, however, of like notches may be cut therein to receive wire strands S, T, looped around and connecting together said laths or strips.

As disclosed more especially by Figs. 1, 2 and 5, I employ yokes $A^2$, for effecting the suitable retention of the shields or guards in upright position, said shields being arranged longitudinally along the rows of the celery or other plants. Each yoke or retainer, which is of stout wire, is of the general outline, as disclosed, having lateral vertical members A, B, which may be slightly bowed or convexed outwardly, said lateral members being suitably bent at their upper ends inwardly and downwardly a limited distance, thus forming upstanding duplicate loops A', B', at those points to receive the upper ends of the spaced apart shields. The downwardly and inwardly turned portions of the loop-formations A', B', are united or connected by a transverse or horizontal member $A^3$ as in producing the same from a single or continuous piece to provide for the retention of the shields against casual or accidental lateral displacement inwardly or outwardly, as is apparent.

As shown more particularly by Figs. 1, 3 and 4, the yokes or retainers designated therein as $A^4$ are differentiated from the above disclosed type, in that they are devoid of the lateral vertical members, not being intended to engage or enter the ground, said yokes or retainers being restricted in their application or use to the upper ends of the shields to aid the yokes or retainers $A^2$ for the effective retention of the shields in position at said ends.

I claim—

1. A device of the character described, comprising a yoke having lateral vertical portions and extended at their upper ends into upstanding loops, the inner downwardly extending portions of said loops being connected by a continuous transverse portion, in combination with shields, the lower ends of said first referred to lateral portion engaging the ground at the lower ends of said shields, said loops receiving the upper ends of said shields.

2. A device of the character described, comprising a yoke having lateral vertical portions and upstanding loops at their upper ends, said loops having their inner downwardly extending portions connected by a transverse portion formed in continuation thereof, in combination with shields, the lower ends of the outer lateral portions of said yoke engaging the ground at the lower ends of said shields, and an additional yoke receiving the upper ends of said shields and having their outer lateral portions terminating above the ground, said first referred to yoke also engaging the upper ends of said shields.

WM. F. ROTZIEN.

Witnesses:
F. N. CONRAD,
M. D. MAIN.